(12) United States Patent
Rakshit et al.

(10) Patent No.: US 9,104,720 B2
(45) Date of Patent: Aug. 11, 2015

(54) GENERATION OF TECHNICAL DESCRIPTION OF REPORT FROM FUNCTIONAL DESCRIPTION OF REPORT

(75) Inventors: Sarbajit Kumar Rakshit, Kolkata (IN); Barry Alan Kritt, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 428 days.

(21) Appl. No.: 13/536,481

(22) Filed: Jun. 28, 2012

(65) Prior Publication Data
US 2014/0006429 A1    Jan. 2, 2014

(51) Int. Cl.
*G06F 17/30* (2006.01)

(52) U.S. Cl.
CPC .... *G06F 17/30401* (2013.01); *G06F 17/30389* (2013.01)

(58) Field of Classification Search
CPC ................ G06F 17/30389; G06F 17/30401
USPC ........................................ 707/755, E17.005
See application file for complete search history.

(56) References Cited

U.S. PATENT DOCUMENTS

| 6,581,052 | B1* | 6/2003 | Slutz ..................................... 1/1 |
| 7,000,182 | B1 | 2/2006 | Iremonger et al. |
| 7,225,396 | B2 | 5/2007 | Chen et al. |
| 2002/0120603 | A1* | 8/2002 | Thompson ........................ 707/1 |
| 2004/0172237 | A1* | 9/2004 | Saldanha et al. .................. 704/4 |
| 2006/0036592 | A1* | 2/2006 | Das et al. .......................... 707/4 |
| 2007/0130194 | A1* | 6/2007 | Kaiser ............................ 707/102 |
| 2008/0071731 | A1* | 3/2008 | Ma et al. ........................... 707/2 |
| 2010/0185643 | A1* | 7/2010 | Rao et al. ...................... 707/759 |
| 2010/0293507 | A1 | 11/2010 | Song et al. |
| 2011/0295866 | A1* | 12/2011 | Fot et al. ....................... 707/756 |

OTHER PUBLICATIONS

"Transact-SQL to get description of column in Sql Server 2005 using fn_listextendedproperty" blog post, http://blog.logiclabz.com, dated no later than Sep. 2, 2009.
"Best practices for maintaining a data dictionary," blog post, http://blog.guident.com, dated Oct. 8, 2010.
M. Patel, "Preservation metadata for crystallography data," JISC eCrystals Federation Project, dated Sep. 3, 2009.
M. Timonen, "Implementation of ontology-based biologic knowledge base," University of Helsinki, Department of Computer Science Master's Thesis, Feb. 21, 2007.

* cited by examiner

*Primary Examiner* — Shiow-Jy Fan
(74) *Attorney, Agent, or Firm* — Damion Josephs

(57) ABSTRACT

A functional description is of a report to be formulated and then run against a database. Report keywords and relationships among the report keywords are extracted from the functional description of the report, using an ontology related to data contained in the database. The report keywords and the relationships among the report keywords are processed or profiled against a data dictionary of the database, such as by performing text mining, to identify particular tables and columns of the database that contain the data needed for the report. The particular tables and columns are a technical description of the report that facilitates formulation of the report. The technical description can also include representative structured query language (SQL) statements and relationships among the identified tables.

14 Claims, 3 Drawing Sheets

GENERATION OF TECHNICAL DESCRIPTION OF REPORT FROM FUNCTIONAL DESCRIPTION OF REPORT

BACKGROUND

A database is an organized collection of information in digital form. Databases permit end users to retrieve information on which basis business decisions and other types of decisions can be made. In particular, reports can be formulated to execute against databases. Execution of a report retrieves data from a database and summarizes and presents this data in useful ways for end user analysis and review.

SUMMARY

A method of an embodiment of the disclosure includes receiving, by a processor of a computing device, a functional description of a report to be formulated and a data dictionary of a database containing data in relation to which the report is to be run after being formulated. The method includes extracting, by the processor, report keywords and relationships among the report keywords from the functional description of the report, using an ontology related to the data contained in the database. The method includes processing, by the processor, the report keywords and the relationships among the report keywords that have been extracted against the data dictionary of the database, such as by performing text mining, to identify particular tables and columns of the database that contain the data needed for the report. The method includes outputting, by the processor, the particular tables and the columns of the database that have been identified as a technical description of the report to facilitate formulation of the report.

A computer-readable data storage medium of an embodiment of the disclosures stores a computer program executable by a processor of a computing device to perform a method. The method includes extracting report keywords and relationships among the report keywords from a functional description of a report to be formulated and then run against a database containing data and stored on a data storage device, using an ontology related to the data contained in the database. The method includes performing a predetermined text mining algorithm in relation to the report keywords, the relationships among the report keywords, and a data dictionary of the database to profile the functional description of the report against the data dictionary. The data dictionary is stored on the data storage device. Performance of the predetermined text mining algorithm identifies particular tables and columns of the database that contain the data needed for the report. The method includes generating a technical description of the report that includes the tables and the columns that have been identified, to facilitate formulation of the report.

A system of an embodiment of the disclosure includes a storage device to store a database containing data in relation to which a report is to be run after being formulated, and to store a data dictionary of the database. The system includes a computing device storing and to execute computer-executable code. The computer-executable code includes first code to extract report keywords and relationships among the report keywords from the functional description of the report, using an ontology related to the data contained in the database. The computer-executable code includes second code to identify particular tables and columns of the database that contain the data needed for the report to generate a technical description of the report that includes the particular tables and columns that have been identified. Identification is performed by profiling the report keywords and the relationships among the report keywords that have been extracted against the data dictionary of the database. The technical description of the report facilitates formulation of the report.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
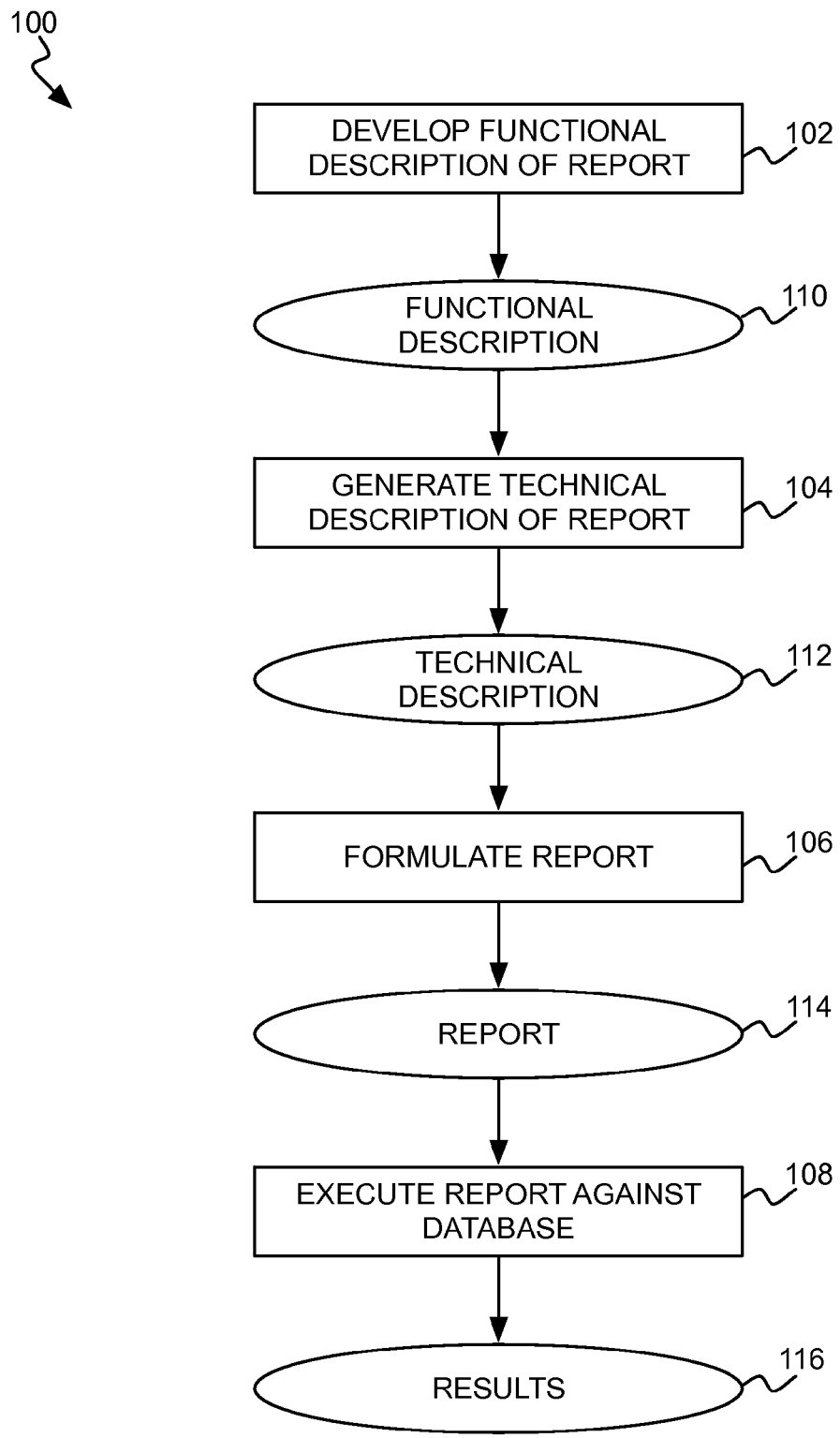
FIG. 1 is a flowchart of an example four-part database report process.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, reports can be formulated for execution against a database, to retrieve, summarize, and present data in useful ways for end user analysis and review. The report process can be a four-part process. First, a functional description of the report can be written. The functional description of a report typically describes in narrative form the information that the reports of the report are to include, and how this information is to be presented. A first type of user, such as a business analyst, may draft the functional description of the report using a word processing computer program. The business analyst is typically not a skilled computer programmer, and may not even be a skilled database developer or analyst.

Second, from the functional description of the report, a technical description of the report is written. The technical description of the report specifies with particularity the information contained in the database in question that is needed to formulate or develop the report, and can include how this information is formatted in the database as well as how this information can be retrieved from the report, such as by specifying representative structured query language (SQL) queries. The technical description itself may still be presented in narrative form, and like the functional description is not directly executable by or against the database. A second type of user, such as a database analyst or developer, may draft the technical description of the report. Such a database analyst may be someone who is not yet sufficiently skilled to develop the report itself, but knows enough about databases that he or she can identify the information that is needed to develop the report to satisfy the functional description.

Third, from the technical description of the report, the report itself is developed or formulated. The report is directly executable by or against the database to query the database for the needed information, and organize, summarize, and format the information retrieved from the database in the manner initially specified in the functional description of the report. A third type of user, such as a database analyst or developer, may develop or formulate the report. Such a database analyst generally requires more skill than the second type of user who creates the technical description of the report. In some scenarios, the same database analyst may perform both the development of the technical description of the report and the formulation of the report itself, although this may be considered as not an optimal usage of labor resources.

Fourth, the report itself after formulation is run or executed against the database and the results presented to an end user. The end user him or herself may run or execute the report against the database by initiating execution of the report. As such, this or another end user can review the results to make a given business decision or other type of decision. The end user that runs or executes the report against the database may be the same or different user that drafted the original functional specification of the report.

It has been determined that one bottleneck in this four-part report process is the translation of the functional description of a report into a technical description of a report, which is the second part of the process described above. It has been found that this part of the report process is time consuming, and user-dependent in that two different users may construct very different technical descriptions from the same functional description of a report. As such, the technical description development process is susceptible to errors, which are then propagated into the third part of the report process in which the report itself is developed. These errors, however, may not be uncovered until the report is actually run in the fourth part of the process, when it is determined that the results of the report do not satisfy the original functional specification drafted in the first part of the report process.

Techniques disclosed herein alleviate these issues by minimizing and indeed by even eliminating user involvement in the generation of the technical description of a report. That is, user analysis of the functional description of a report to generate the technical description of the report is minimized or even eliminated. Such minimization or elimination of user involvement further removes the particular bottleneck that can delay the development of reports from functional descriptions thereof.

For instance, a computing device may receive a functional description of a report to be formulated and a data dictionary of a database containing data in relation to which the report is to be run. The computing device extracts report keywords and relationships among the report keywords from the functional description of the report, using an ontology related to the data contained in the database. The computing device identifies particular tables and columns of the database that contain the data needed for the report.

Such identification can be achieved by processing or profiling the report keywords and the relationships among the report keywords against the dictionary of the database. For instance, text mining can be performed in relation to the report keywords, the relationships among the report keywords, and the data dictionary to profile the particular tables and columns that contain the data needed for the report. Performance of such text mining, in other words, identifies the particular tables and columns of the database that contain the data needed for the report.

The technical description of the report includes these particular tables and columns of the database. The computing device may further generate and output SQL statements that indicate how the database can be queried to retrieve the data for the report, as well as identify and output relationships among the tables themselves. Such sample SQL statements and relationships are also considered to be part of the technical description of the report.

FIG. 1 illustratively depicts an example four-part report process 100 consistent with the above description. The report process 100 includes four parts 102, 104, 106, and 108. In the first part 102, a functional description 110 of a report is developed. In the second part 104, a technical description 112 of the report is generated from the functional description 110. In the third part 106, the report 114 is formulated from the technical description 112. In the fourth part 108, the report 114 is executed or run against a database to yield results 116 that are presented to an end user. Techniques disclosed herein are thus primarily concerned with the second part 104, in which the technical description 112 is generated from the functional description 110.

Figure 2:
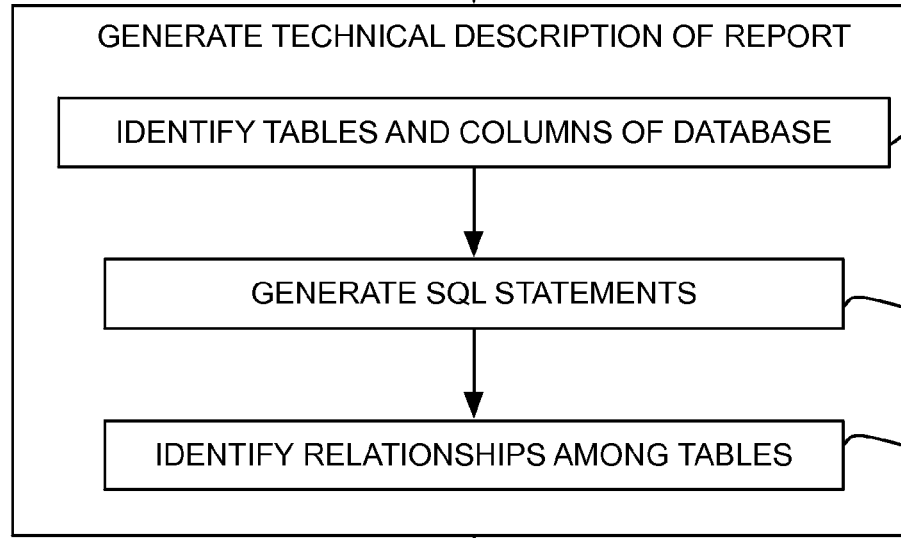
FIG. 2 is a flowchart of an example method for generating a technical description of a database report from a functional description of the database report.

FIG. 2 shows an example method 200 for generating a technical description of a report from a functional description of the report. The method 200 can thus be performed to implement part 104 of the four-part report process 100. A processor of a computing device can particularly execute a computer program including computer-readable and computer-executable code to effectuate the method 200. That is, the computing device and the processor thereof can perform the method 200.

The functional description of the report and a data dictionary of a database are received (202). The database includes data in relation to which the report is run after having been formulated. That is, once the report is formulated, the report is executed against the database to yield results that are presented to a user, in accordance with the functional description of the report.

The data dictionary of the database can include a list of all the tables and the columns of the tables within the database, descriptions of all the tables and columns, and technical details regarding all the tables and columns. The tables and the columns are identified by name and data type within the data dictionary, which are examples of technical details regarding the tables and the columns. This information can be part of metadata of the database regarding the tables and columns. For instance, each table and each column can include related properties that provide a description of the table or column in question. As one example, the name for a column may be "password" that has a data type "varchar (20)," meaning that records can include data for this column of the character type of any length up to twenty characters. Within the properties of the column, a description property may indicate that the column "stores an encrypted password," which is an example of a description of a column. The web page available on the Internet at www.bcarter.com/tip039.htm provides further information as to what a data dictionary of a database is.

The functional description of the report is a textual description of the required specifications for the report. The functional description specifies the data that is to be used to execute the report, and the information that results of the report should contain. For example, the functional description may specify that sales data should be reported by country, by customer, by product, and by week. The functional description of the report may also specify how the information is to be presented, such as its formatting, and so on. The functional description of the report may also be referred to as the functional specification of the report, because it specifies the functionality of the report, without providing specifics as to how this functionality is to be achieved.

For instance, the functional description does not identify the tables and columns of the database that are to be used to formulate the report. Indeed, the business analyst or other user creating the functional description may not be aware as to how the data of the database is organized therein. At a minimum, the business analyst or other user creating the functional description is unlikely at best to know the specific names of the columns and the tables contained within the database.

The functional description can include both text and images. The text forms a textual description of the report, as described above, and can provide information as to the structure of the report, such as how the information contained within the report is to be presented. The images can also provide the structure of the report. For example, the images can include one or more screenshots of proposed views of the report. The user creating the functional description may thus provide a mockup as to how the report should look when it is generated, where these screenshots or other images graphically indicate such structure of the report to be generated.

Report keywords and relationships among the report keywords are extracted from the functional description of the report (204). The report keywords can be extracted from the functional description in a variety of different ways. For instance, the functional description of the report may be formatted in accordance with a predetermined specification that requires the user to enter certain words in certain places, such that these words are then extracted from their predetermined locations as the report keywords. In general, the report keywords and the relationships among them are extracted using an ontology related to the data contained in the database.

An ontology formally represents knowledge as a set of concepts within a domain, such as the business to which the data contained in the database is related. The ontology also formally represents relationships among these concepts. Such an ontology can thus be used to reason about entities within this domain, such as data elements therein, and can be used to describe the domain. As such, the ontology is used to extract the report keywords and the relationships among the report keywords from the functional description of the report. Such relationships are or can be semantic relationships. Various existing and other terminology mining, recognition, or extraction techniques can be employed to perform this extraction, which can be considered as a relatively basic form of natural language processing.

The technical description of the report is generated (218), to facilitate subsequent formulation of the report. Generating the technical description of the report includes one or more of the following. Particular tables and columns of the database can be identified (220). Specifically, the particular tables and columns of the database that contained the data needed for the report—i.e., to generate the report—are identified. Identification of the particular tables and columns is achieved by processing the report keywords and the relationships among the report keywords that have been extracted against the data dictionary of the database.

For instance, text mining can be performed in relation to the report keywords, the relationships among the report keywords, and the data dictionary for the database to profile the functional description of the report against the data dictionary. Text mining, which can also be referred to as text data mining, is a text analysis technique to derive information from text. Text mining typically involves structuring and parsing input text, which in this case includes the report keywords, their relationships, and the data dictionary, to obtain desired information, which in this case includes particular tables and columns of the database. Various existing and other predetermined text mining techniques can be employed.

Such identification in part 220 can further include identifying and removing any orphan tables from the particular tables that have been identified. Orphan tables are tables that have no table in common with any other particular table that has been identified. Such identification in part 220 can also include locating and adding any bridge tables to the set of particular tables that have been identified. Bridge tables are tables that two or more of the particular tables reference, and thus bridge these particular tables. Each bridge table is therefore considered as a particular table that has been identified, no differently than the tables identified earlier that include one or more of the selected keywords.

In some situations, the functional description of the report may not be able to be directly or indirectly satisfied with any of the columns and tables of the database. In one implementation, part 220 also identifies these parts of the functional description that cannot be satisfied directly or indirectly with the columns and tables of the database. Stated somewhat differently, part 220 also is able to identify missing tables and columns of the database; that is, tables and columns that are required to implement the functional description of the report, but that are not present in the database. Such tables in particular may be part of a database other than the database for which the data dictionary was received in part 202. As such, part 220 may identify such missing tables that are needed to formulate report as described in the functional description of the report.

Furthermore, in some situations, a portion of the functional description of the report may not be able to be directly translated to a given column of a table of the database, but may be able to be indirectly translated to a number of columns of a table of the database. For example, such a portion of the functional description may reference a key performance indicator (KPI) such as profit, but no column of any table of the database directly stores profit information. However, profit may be able to be calculated, such as via the equation (unit sales price multiplied by sales quantity) minus (unit raw material price multiplied by quantity of raw material). Therefore, part 220 may identify the columns referencing the information needed to calculate such a KPI specified in the functional description of the report, as well as provide how these columns can be used to generate the desired information specified in the functional description. In the example, for instance, the columns referencing unit sales price, sales quantity, unit raw material price, and quantity of raw material may be identified, and the above-noted equation provided as part of the technical description to relate these columns.

In such an implementation, there can be a rule database, in which various KPIs that may be referenced within a functional description defined in relation to columns that are present in tables of the database. For each such KPI, how the KPI can be indirectly calculated using information directly stored in the columns of the database may also be stored in the rule database. When any of these KPIs is referenced within the functional description, therefore, part 220 can look up the KPI within the rule database to determine columns of the database that store the information needed to generate the KPI in question, as well as the equation or other manner by which the KPI is generated from this information, for placing within the technical description of the report. A corresponding and appropriate SQL statement may also be generated in this respect for inclusion within the technical description, as is now described more generally.

Generating the technical description of the report can thus include generating representative SQL statements for querying the columns of the tables (222). Each such SQL statement thus indicates how the database can be queried to retrieve the data stored in the database that is related to the selected keywords. The representative SQL statements can then be used to facilitate formulation of the report itself.

Generating the technical description of the report can also include outputting relationships among the tables that have been identified (224). For instance, how the tables refer to one another, such as directly, or indirectly via bridge tables, can be output. Providing this information facilitates formulation of the report itself, as the database analyst or other user can better grasp how the database in question is formatted or organized as to the tables and columns that have been identified.

The technical description is then output for use by a database analyst or other user on which basis to formulate the report (226). The technical description can therefore include a list of the particular tables and columns that have been identified in part 220, the representative or sample SQL statements that have been generated in part 222, and/or the relationships among the tables that have been identified in part 224. Formulation of the report can thus now be performed more quickly, because the bottleneck of technical description generation has been ameliorated. Furthermore, user-dependent differences when generating the technical description of the report are avoided, because users are not involved in the technical description generation process of the method 200.

Figure 3:
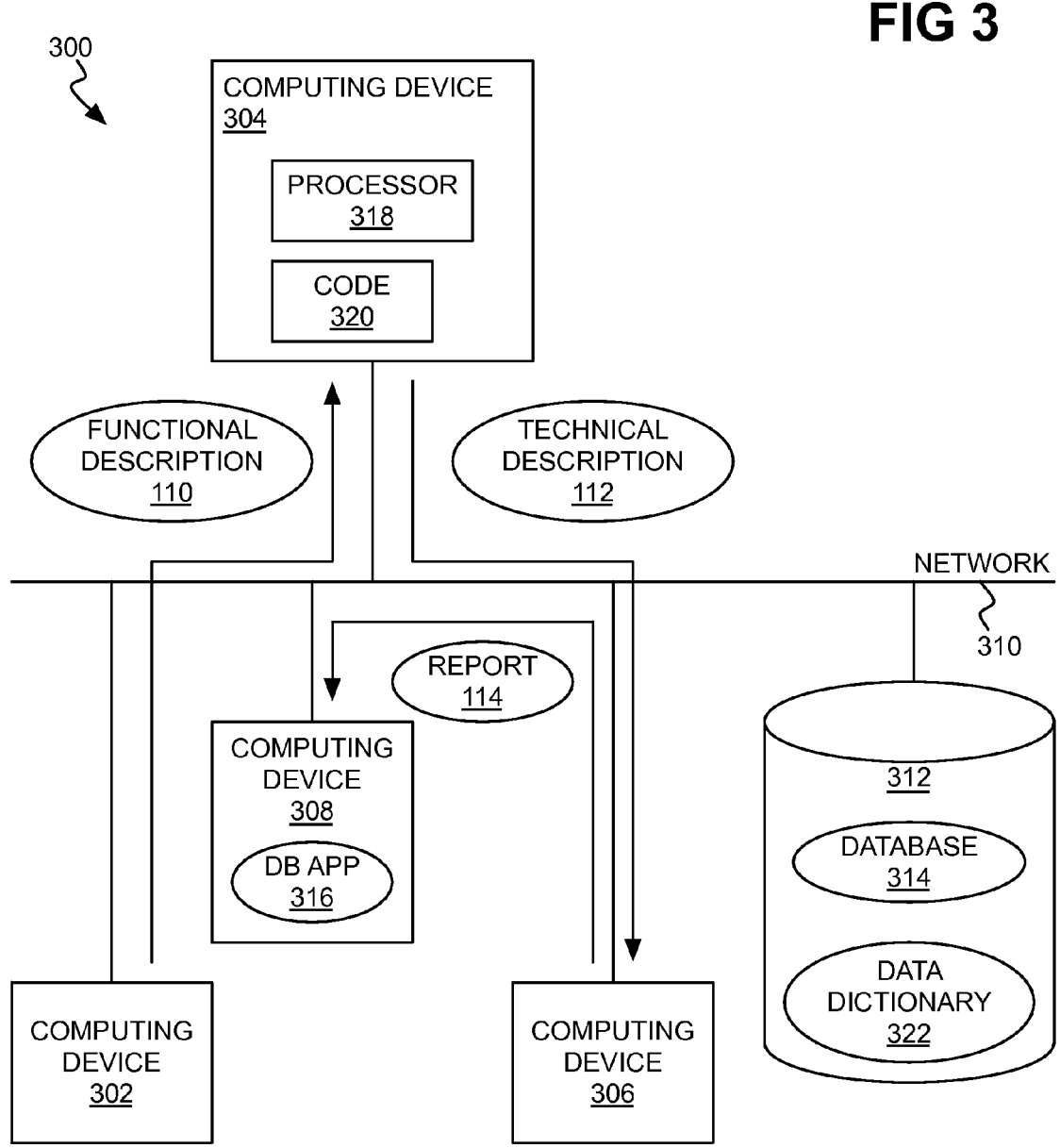
FIG. 3 is a diagram of an example system in relation to which an example usage scenario is described.

FIG. 3 shows an example system 300 in relation to which a representative usage scenario is described. The system 300 includes four computing devices 302, 304, 306, and 308 interconnected by a network 310. Each of these computing devices 302, 304, 306, and 308 can be a computer like a desktop or laptop computer, a thin client computing device, a server computing device, or another type of computing device. The network 310 may be or include the Internet, an intranet, an extranet, a local-area network, a wide-area network, a wired network, a wireless network, a telephony network like a mobile device network, and so on. While four computing devices 302, 304, 306, and 308 are depicted in FIG. 3, there may be more than or less than four computing devices, such as at least one computing device.

The system 300 further includes a storage device 312 that is communicatively connected to the computing devices 302, 304, 306, and 308 over the network 310. The storage device 312 stores a database 314 against which the report 114 is to be executed or run. The storage device 312 also stores a data dictionary 322 of the database 314, although the data dictionary 322 may be stored as metadata as part of the database 314 in a different implementation. The storage device 312 may include one or more physical storage devices like hard disk drives, solid state drives, and so on. The physical storage devices may be organized in an array, within a storage-area network, or in a variety of other ways as well.

A business analyst or other type of user employs the computing device 302 to generate the functional description 110 of the report 114, which is transmitted to the computing device 304. The computing device 304 includes a processor 318 and computer-executable code 320 that the processor 318 executes. The computing device 304 can and typically does include other components, in addition to those depicted in FIG. 3, such as memory, and so on.

The processor 318 executes the computer-executable code 320 to generate the technical description 112, as has been described. The computer-executable code 320 can thus implement the method 200. For instance, the computer-executable code 320 can include first code to extract keywords and relationships from the functional description 110 of the report 114 to be constructed and to extract database keywords from a database description of the database 314, and second code to generate the technical description 112 of the report 114, by at least identifying particular tables and columns of the database 314. The particular tables and columns identified are included within the technical description 112 of the report 114. The second code can generate and include within the technical description 112 representative SQL statements that indicate how the database 314 is to be queried to retrieve data related to the common keywords. The fourth code can also include within the technical description 112 relationships among the identified tables.

The computing device 306 receives the technical description 112 of the report 114 to be formulated, from the computing device 304 over the network 310. A database analyst or developer or other user then formulates the report 114 from the technical description 112. The user formulating the report 114 at the computing device 306 is typically a different user than that who drafted the functional description 110 at the computing device 302. Whereas the latter user is more of a business-side user, the former user is more of a technical-side user.

The computing device 308 receives the report 114, from the computing device 306 over the network 310. The computing device 308 includes a database application program 316 for querying of and running reports like the report 114 against the database 314. A user like an end user of the report 114 executes the report 114 against the database 314 to review the results of the report 114, or to present these results to someone else. The user of the computing device 308 is typically a different user than either or both of the users of the computing devices 302 and 306.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:
1. A method comprising:
receiving, by a processor of a computing device, a functional description of a report to be formulated and a data dictionary of a database containing data in relation to which the report is to be run after being formulated,
the functional description of the report describing in narrative form information that the report is to include and how the information is to be presented;
extracting, by the processor, report keywords and relationships among the report keywords from the functional description of the report, using an ontology related to the data contained in the database, by:
receiving a predetermined specification of the functional description in accordance with which the functional description has been formatted;
extracting the report keywords from predetermined locations of the functional description specified by the predetermined specification;
extracting the relationships among the extracted report keywords by performing semantic relationship natural language processing on the extracted report keywords;
processing, by the processor, the extracted report keywords and the extracted relationships among the extracted report keywords against the data dictionary of the database to identify particular tables and columns of the database that contain the data needed for the report, by:

performing text mining in relation to the extracted report keywords, the relationships among the extracted report keywords, and the data dictionary to profile the functional description against the data dictionary to obtain information regarding the functional description comprising the particular tables and columns of the database;

for any portion of the functional description that is unable to be directly translated to the particular tables and columns via the text mining, identifying a plurality of additional columns and a calculation thereof to yield the portion of the functional description;

generating representative SQL statements for querying the columns of the particular tables to retrieve the data needed for the report; and outputting, by the processor, the particular tables and the columns of the database that have been identified as a technical description of the report to facilitate formulation of the report, the technical description of the report describing in narrative form the information contained in the database that is needed to formulate the report, how the information is formatted in the database, and an example as to how the information can be retrieved from the database, wherein the technical description cannot be directly executed against the database to generate the report.

2. The method of claim 1, wherein outputting the particular tables and columns of the database that have been identified minimizes user analysis of the functional description to generate the technical description of the report.

3. The method of claim 1, wherein the data dictionary comprises a list of all tables and columns of the database, including the particular tables and columns, descriptions of all the tables and columns, and technical details regarding all the tables and columns.

4. The method of claim 1, wherein the structure of the report is contained with the functional description of the report as a screenshot of a proposed view of the report.

5. The method of claim 1, wherein the relationships among the report keywords comprise semantic relationships among the report keywords.

6. The method of claim 1, wherein processing the report keywords and the relationships among the report keywords against the data dictionary to identify the particular tables and columns that contain the data needed to fulfill the report comprises:

locating and removing any orphan tables from the particular tables that have been identified; and locating and adding any bridge tables to the particular tables that have been identified.

7. The method of claim 1, wherein processing the report keywords and the relationships among the report keywords against the data dictionary to identify the particular tables and columns that contain the data needed to fulfill the report comprises:

determining that a part of the report cannot be fulfilled directly or indirectly with any table or column of the database; and in response, identifying a missing table that is not present in the database, that is present in a different database, and that is required to fulfill the report, the missing table included within the technical description of the report.

8. The method of claim 1, wherein processing the report keywords and the relationships among the report keywords against the data dictionary to identify the particular tables and columns that contain the data needed to fulfill the report comprises:

determining that a part of the report cannot be fulfilled directly with any column of the database, but can be fulfilled indirectly with one or more specific columns of the database;

determining a relationship of the one or more specific columns that indicates how the part of the report can be indirectly fulfilled using the one or more specific columns, the relationship and identification of the one or more specific columns within the technical description of the report.

9. The method of claim 1, further comprising:
outputting relationships among the particular tables that have been identified, to facilitate the formulation of the report.

10. The method of claim 1, further comprising:
formulating the report, by a user, based on the technical description of the report; and
running the report as formulated against the database.

11. A computer-readable data storage medium storing a computer program executable by a processor of a computing device to perform a method comprising:

receiving a functional description of a report to be formulated and a data dictionary of a database containing data in relation to which the report is to be run after being formulated, the functional description of the report describing in narrative form information that the report is to include and how the information is to be presented;

extracting report keywords and relationships among the report keywords from the functional description of the report, using an ontology related to the data contained in the database, by:

receiving a predetermined specification of the functional description in accordance with which the functional description has been formatted;

extracting the report keywords from predetermined locations of the functional description specified by the predetermined specification;

extracting the relationships among the extracted report keywords by performing semantic relationship natural language processing on the extracted report keywords;

processing the extracted report keywords and the extracted relationships among the extracted report keywords against the data dictionary of the database to identify particular tables and columns of the database that contain the data needed for the report, by:

performing text mining in relation to the extracted report keywords, the relationships among the extracted report keywords, and the data dictionary to profile the functional description against the data dictionary to obtain information regarding the functional description comprising the particular tables and columns of the database;

for any portion of the functional description that is unable to be directly translated to the particular tables and columns via the text mining, identifying a plurality of additional columns and a calculation thereof to yield the portion of the functional description;

generating representative SQL statements for querying the columns of the particular tables to retrieve the data needed for the report; and outputting the particular tables and the columns of the database that have been identified as a technical description of the report to facilitate formulation of the report, the technical description of the report describing in narrative form the information contained in the database that is needed to formulate the report, how the information is formatted in the database, and an example as to how the information can be retrieved from the database, wherein the technical description cannot be directly executed against the database to generate the report.

12. The computer-readable data storage medium of claim 11, wherein extracting the report keywords and the relationships among the report keywords from the functionality description of the report, using the ontology, comprises:

analyzing a textual description of the report as contained within the functional description of the report and a structure of the report as contained within the functional description of the report as a screenshot of a proposed view of the report.

13. The computer-readable data storage medium of claim 11, wherein the relationships among the report keywords comprise semantic relationships among the report keywords.

14. A system comprising:

a storage device to store a database containing data in relation to which a report is to be run after being formulated, and to store a data dictionary of the database; and a computing device storing and to execute computer-executable code comprising:

first code to extract report keywords and relationships among the report keywords from the functional description of the report, using an ontology related to the data contained in the database, the functional description of the report describing in narrative form information that the report is to include and how the information is to be presented, by:

receiving a predetermined specification of the functional description in accordance with which the functional description has been formatted;

extracting the report keywords from predetermined locations of the functional description specified by the predetermined specification;

extracting the relationships among the extracted report keywords by performing semantic relationship natural language processing on the extracted report keywords;

second code to process the extracted report keywords and the extracted relationships among the extracted report keywords against the data dictionary of the database to identify particular tables and columns of the database that contain the data needed for the report, by:

performing text mining in relation to the extracted report keywords, the relationships among the extracted report keywords, and the data dictionary to profile the functional description against the data dictionary to obtain information regarding the functional description comprising the particular tables and columns of the database;

for any portion of the functional description that is unable to be directly translated to the particular tables and columns via the text mining, identifying a plurality of additional columns and a calculation thereof to yield the portion of the functional description;

generating representative SQL statements for querying the columns of the particular tables to retrieve the data needed for the report; and third code to output the particular tables and the columns of the database that have been identified as a technical description of the report to facilitate formulation of the report, the technical description of the report describing in narrative form the information contained in the database that is needed to formulate the report, how the information is formatted in the database, and an example as to how the information can be retrieved from the database, wherein the technical description cannot be directly executed against the database to generate the report.

* * * * *